Sept. 12, 1967  D. A. COLLINS  3,341,364
PREPARATION OF THIN FILM INDIUM ANTIMONIDE
FROM BULK INDIUM ANTIMONIDE
Filed July 27, 1964

DAVID A. COLLINS
INVENTOR.

BY *J. M. St. Amand*

ATTORNEY

3,341,364
PREPARATION OF THIN FILM INDIUM ANTIMONIDE FROM BULK INDIUM ANTIMONIDE
David A. Collins, Ontario, Calif., assignor to the United States of America as represented by the Secretary of the Navy
Filed July 27, 1964, Ser. No. 385,523
2 Claims. (Cl. 117—227)

The invention herein described may be manufactured and used by or for the Government of the United States of America for governmental purposes without the payment of any royalties thereon or therefor.

The present invention relates to semi-conductors and more particularly to the preparation of thin-film InSb by vapor deposition of bulk InSb.

Numerous attempts have been made in the past to prepare thin-film InSb from bulk InSb by using multiple layer or multiple temperature techniques. See, Brentano and Richards, Phys. Rev. 94, 1427 (1954); Buttrey, Rev. of Sci. Instr., vol. 30, No. 5, 815–817, September (1955); Layer, Reid and Austin, Battelle Memorial Institute, Columbus, Ohio; Lincoln Lab. Library, reference bibliography, "Preparation and Properties of Indium Antimonide Thin-Films and Devices Using Indium Antimonide." However, films prepared by the multiple-layer and multiple-temperature methods are variable due to the difficulty in maintaining the precise vapor deposition rate of indium and antimony. Also, the required temperature control of the crucibles and substrate is critical, and, the amount of material contained in the crucible greatly affects the results. In addition a heated substrate is necessary when using these techniques. However, the high substrate temperature necessary for recombination of the indium and antimony, produce small crystallites, and the smaller the crystallite, the poorer the electrical properties.

Experiments were performed on coating regular InSb thin-films (prepared by the customary three-temperature method) with indium (and other metals) and heating. The results of these experiments are disclosed in copending U.S. patent application Ser. No. 356,330 filed Mar. 31, 1964, by A. R. Clawson and H. H. Wieder. It was found that if a coated film was heated in a vacuum or inert atmosphere, a definite surface change appeared, resembling a wetting action. The films thus converted generally showed a greatly enhanced magnetoresistance. In general the film resistance decreased and mobility increased. An attempt was then made to evaporate bulk InSb and then convert the film using the above process.

Preparation of thin-film InSb from bulk InSb presents several important advantages, since only one evaporation crucible is required and temperature control is no longer needed. However, the same problems occur as regards proper recombination of the indium and antimony. A film prepared by bulk evaporation of InSb can be heated afterward in a vacuum or inert atmosphere, but the problem is that the vapor pressures of indium and antimony differ greatly and stoichiometry is destroyed.

The method of the instant invention consists of the steps of: totally evaporating InSb onto a glass or similar substrate by the use of molybdenum or other suitable boat, coating the resultant film with a thin film of pure indium, and heating the coated film until the coating melts and wets the surface.

It is an object of the invention, therefore, to provide a novel method for the preparation of thin-film indium antimonide from bulk indium antimonide.

Another object of the invention is to provide indium antimonide films suitable for Hall effect generators and magnetoresistive elements.

A further object of the invention is to provide thin indium antimonide films with few large crystals rather than many small crystallites.

Other objects and many of the attendant advantages of this invention will become readily appreciated as the same becomes better understood by reference to the following detailed description when considered in connection with the accompanying drawings wherein.

Figure 1:
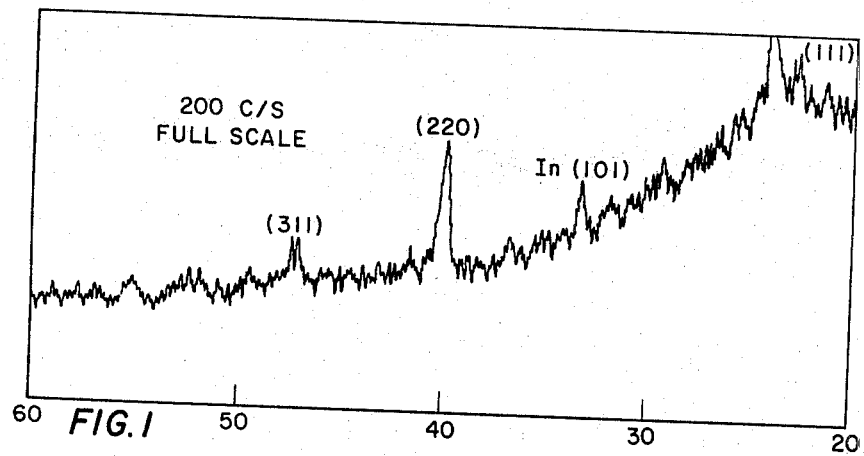
FIG. 1 is an X-ray diffraction graph of a film made from bulk InSb evaporated onto an unheated substrate.
Figure 2:
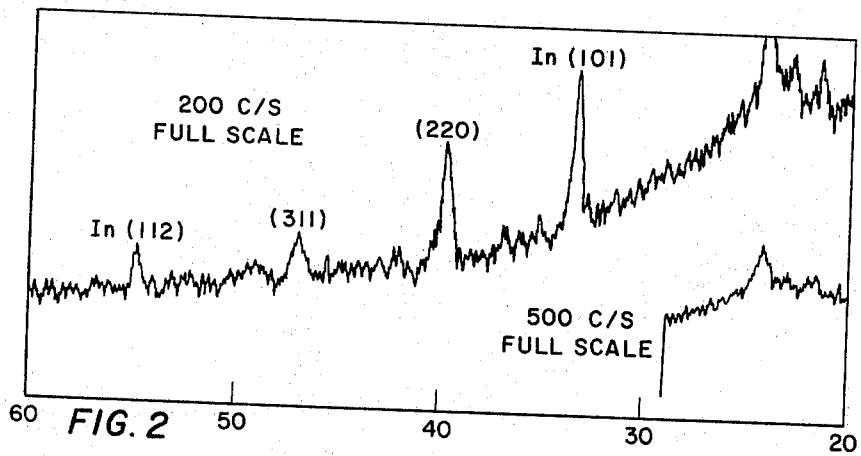
FIG. 2 shows an X-ray diffraction graph of the same InSb film as used for FIG. 1 after a thin indium coating has been applied.
Figure 3:
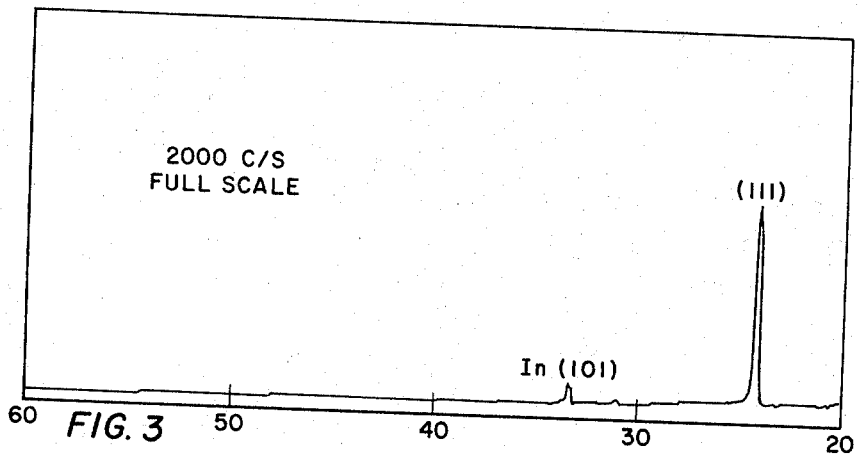
FIG. 3 shows an X-ray diffraction graph of the film used for making the graph of FIG. 2 after heating until the coating melted and wetted the surface of the film and then cooled until the film re-crystallized and the indium and antimony recombined.

The preparation of thin film InSb in accordance with the instant invention is as follows: Bulk InSb is evaporated in vacuum, usually at a temperature between 550 and 800° C., onto heated glass, Pyrex or other suitable substrates. Total evaporation of the bulk InSb is used to provide the proper proportions, up to several microns in thickness, on the substrate. A molybdenum or other suitable evaporation boat or crucible is used and the evaporation rate is not critical, for instance usually 0.5 to 1 minute, but more or less time may be taken. The film thickness is controlled by the amount of material evaporated and/or the distance between the substrate and the boat. The evaporations are done at approximately $10^{-3}$ torr vacuum pressure. The films are then coated in vacuum by a thin-film (approximately 100–500 A. thickness) of pure indium or other suitable material and heated (usually in excess of 500° C. but not likely greater than 600° C.) until the coating melts on the surface. Then the entire film is heated until it liquifies. The heat source is removed and upon cooling, the film re-crystallizes and the indium and antimony have recombined leaving a slight excess of free indium between the crystallites. X-ray diffraction studies of these films are shown in FIGS. 1–3. FIG. 1 is a graph made from a film after evaporation and prior to coating. FIG. 2 is a graph made from the same film as used in FIG. 1 after a thin indium coating had been applied. FIG. 3 is a graph made from the same film as used for FIG. 2 after heating, with the (111) plane of the crystals parallel to the plane of the substrate, and a slight excess of free indium. The results of the X-ray studies are essentially the same as those made on good films prepared by the normal three-temperature method.

Films prepared by this method compare favorably with the best of the films prepared by the prior three-temperature method, or exceed them as regards to mobility, magnetoresistance, and Hall coefficient. Preparation is much simpler and results are much more uniform. If a film is heated just to the melting point of the indium coating and then cooled, it is possible to prepare a film with a high Hall coefficient and little or no magnetoresistance. A typical film where only the coating was melted showed the following behavior.

Resistance:
    0 gauss, 165Ω
    5000 gauss, 230Ω
Hall voltage (5 kg.)
    1 ma., 31.1 mv.
    5 ma., 154.9 mv.
    10 ma., 309.0 mv.
    20 ma., 614.2 mv.
Mobility: 9440

Of films prepared for maximum magnetoresistance, the following shows the type of performance which can be achieved:

| Resistance: | Field |
|---|---|
| 100Ω | gauss 0 |
| 200Ω | kg 4 |
| 320Ω | kg 7 |
| 423Ω | kg 10 |

The instant invention permits films of indium-antimonide, prepared by evaporation of bulk InSb, to be heated higher than the melting point of the compound, and as a result, the recrystallization can be either controlled visually by the operator or by automatic means. Thus, a compound with much larger crystals than provided by the prior known three-temperature or annealing process can be produced. Further, the instant process can be completed in a matter of minutes, compared with six or more hours required in previous processes, and results in thinner InSb with far superior electrical properties.

Obviously many modifications and variations of the present invention are possible in the light of the above teachings. It is therefore to be understood that within the scope of the appended claims the invention may be practiced otherwise than as specifically described.

What is claimed is:

1. The preparation from bulk indium antimonide of thin indium-antimonide films having high Hall coefficient and maximum magnetoresistance comprising:
    (a) evaporation of bulk InSb onto an unheated suitable substrate in proportion to provide an InSb film of up to several microns thickness as desired at approximately $10^{-3}$ torr vacuum pressure,
    (b) coating said InSb film in vacuum with a thin-film of pure indium of approximately 100–500 A. thickness,
    (c) heating said indium coated InSb film in vacuum until said pure indium coating melts on the surface of said InSb film,
    (d) further heating said coated film in vacuum until the InSb also liquifies, and then removing the heat allowing the composite film to cool and recrystallize with the indium and antimony recombined leaving a slight excess of free indium between the crystallites.

2. The preparation from bulk indium antimonide of thin indium-antimonide films having high Hall coefficient and little to no magnetoresistance comprising:
    (a) evaporation of bulk InSb onto an unheated suitable substrate in proportion to provide an InSb film of up to several microns thickness as desired at approximately $10^{-3}$ torr vacuum pressure,
    (b) coating said InSb film in vacuum with a thin-film of pure indium of approximately 100–500 A. thickness,
    (c) heating said indium coated InSb film in vacuum until just said pure indium coating melts on the surface of said InSb film,
    (d) removing the heat and allowing the composite film to cool and recrystallize.

References Cited

UNITED STATES PATENTS

| 2,759,861 | 8/1956 | Collins et al. | 117—201 X |
| 2,938,816 | 5/1960 | Gunther | 117—212 |
| 3,082,124 | 3/1963 | French et al. | 117—211 |
| 3,101,280 | 8/1963 | Harrison et al. | 117—201 |

FOREIGN PATENTS 1,041,582  10/1958  Germany.

ALFRED L. LEAVITT, *Primary Examiner.*

W. L. JARVIS, *Assistant Examiner.*